United States Patent [19]

Czauderna et al.

[11] Patent Number: 4,996,270

[45] Date of Patent: Feb. 26, 1991

[54] VINYL ESTER RESINS

[75] Inventors: Bernhard Czauderna, Hirschberg; Juergen Nieberle, Wachenheim; Roland Peter, Ludwigshafen; Dietmar Nissen, Heidelberg, all of Fed. Rep. of Germany

[73] Assignee: BASF Aktiengesellschaft, Ludwigshafen, Fed. Rep. of Germany

[21] Appl. No.: 267,714

[22] Filed: Nov. 4, 1988

Related U.S. Application Data

[63] Continuation of Ser. No. 868,703, May 30, 1986, abandoned.

[30] Foreign Application Priority Data

Jun. 5, 1985 [DE] Fed. Rep. of Germany ....... 3520113

[51] Int. Cl.$^5$ .................................... C08F 283/10
[52] U.S. Cl. .................................. 525/531; 525/534; 528/86; 528/246; 528/392
[58] Field of Search .................. 525/531, 534; 528/86, 528/246, 392

[56] References Cited

U.S. PATENT DOCUMENTS

| | | | |
|---|---|---|---|
| 4,143,090 | 3/1979 | Vargiu et al. | 525/531 |
| 4,468,524 | 8/1984 | Zahir et al. | 560/221 |
| 4,483,758 | 11/1984 | Rowe | 525/531 |
| 4,500,664 | 2/1985 | McKinney et al. | 524/289 |

*Primary Examiner*—Jacob Ziegler
*Attorney, Agent, or Firm*—Keil & Weinkauf

[57] ABSTRACT

Vinyl ester resins possess unsaturated terminal groups and are based on polyphenols of the formula

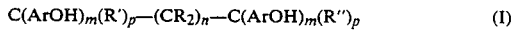

$$C(ArOH)_m(R')_p—(CR_2)_n—C(ArOH)_m(R'')_p \qquad (I)$$

or

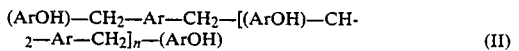

$$(ArOH)—CH_2—Ar—CH_2—[(ArOH)—CH_2—Ar—CH_2]_n—(ArOH) \qquad (II)$$

wherein R, R' and R" may be identical or different and are each H or CH$_3$, Ar is phenylene which is unsubstituted or substituted by methyl or methoxy, n is 0, 1 or 2, m is 1 or 2 and p is 3−m.

4 Claims, No Drawings

VINYL ESTER RESINS

This application is a continuation of application Ser. No. 868,703, filed on May 30, 1986, now abandoned.

The present invention relates to vinyl ester resins which are based on polyphenols and possess unsaturated terminal groups.

Vinyl ester resins are monomer solutions of reaction products of epoxy resins based on polyphenols with unsaturated carboxylic acids, or reaction products of the polyphenols with glycidyl methacrylate or chlorohydroxypropyl methacrylate.

Usually, bisphenol A or novolaks are used as polyphenols. Cured moldings of vinyl ester resins based on bisphenol A are very tough but possess poor heat distortion resistance, whereas those consisting of vinyl ester resins based on novolaks possess good heat distortion resistance but are very brittle.

It is an object of the present invention to provide vinyl ester resins which give moldings possessing good heat distortion resistance coupled with great toughness.

We have found that this object is achieved, according to the invention, if the polyphenols used are those of the general formula I or II.

The first group of polyphenols according to the invention are of the general formula

$$C(ArOH)_m(R')_p\text{—}(CR_2)_n\text{—}C(ArOH)_m(R'')_p, \quad (I)$$

where R, R' and R'' may be identical or different and are each H or CH$_3$, Ar is phenylene which is unsubstituted or substituted by methyl or methoxy, n is 0, 1 or 2, m is 1 or 2 and p is 3 − m.

R' and R'' are each preferably CH$_3$, R is preferably H and Ar is preferably phenylene.

Particularly preferred polyphenols of the formula I are 2,2,3,3-tetrakis-4-hydroxyphenylbutane, 2,2,4,4-tetrakis-(4-hydroxyphenyl)-pentane, 2,2,5,5-tetrakis-(4-hydroxyphenyl)-hexane and 1,1,3-tris-(4-hydroxyphenyl)-propane.

Phenols of the formula I are known per se, for example from A. M. Paquin, Epoxyverbindungen und Epoxidharze, Springer-Verlag 1958. They can be prepared by condensation reactions or condensation/addition reactions of appropriate carbonyl compounds (e.g. diacetyl or acrolein) with phenols.

The second group of polyphenols according to the invention are of the general formula

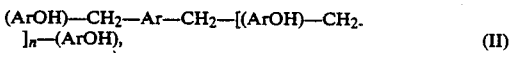

$$(ArOH)\text{—}CH_2\text{—}Ar\text{—}CH_2\text{—}[(ArOH)\text{—}CH_2\text{—}]_n\text{—}(ArOH), \quad (II)$$

where Ar is phenylene which is unsubstituted or substituted by methyl or methoxy, and n is from 0 to 10, preferably 0, 1 or 2. α,α'-Dihydroxyphenyl-p-xylene and hydroxyphenylene-2,6-di-α-hydroxyphenyl-p-xylene are particularly preferred. These polyphenols too are known per se, for example from GB-A-1 338 219. They can be prepared, for example, by Friedel-Crafts condensation of α,α'-dimethoxy-p-xylene and phenol. The polyphenols are obtained in the preparation in general as a mixture with minor amounts of oligomers; they can be directly processed further as such.

The vinyl esters can be prepared from these polyphenols by a conventional process, for example by epoxidizing the polyphenol with epichlorohydrin and reacting the product with an unsaturated carboxylic acid, preferably methacrylic acid, or by reacting the polyphenol with glycidyl methacrylate or chlorohydroxypropyl methacrylate.

The vinyl ester resins contain the conventional copolymerizable diluents, such as styrene, ethylhexyl, ethyl, butyl or dicyclopentadienyl acrylate, vinyl pivalate, vinyl propionate or diallyl phthalate.

They may also contain conventional additives, such as reinforcing fibers, e.g. glass mats, fillers, thickeners and thixotropic agents, as well as low-shrink and low-profile additives.

The novel vinyl ester resins can be cured at from 20° to 200° C., depending on the curing agent used, to give moldings which can be employed, for example, as automotive components, such as leaf springs, or as sheet molding compounds.

In the Examples, parts and percentages are by weight.

EXAMPLES

A. Preparation of the polyphenols

1. 1,1,2-Tris-(4-hydroxyphenyl)-propane 42 moles of phenol, 3 moles of acrolein and 2 ml of concentrated hydrochloric acid were initially taken together. The mixture was heated to 50° C., which caused it to liquefy. It was stirred for 1 hour at this temperature and then heated to 80° C., after which stirring was continued for a further hour. The excess phenol was finally distilled off by means of a Sambay distillation under from 1 to 5 mbar and at a heating jacket temperature of 140° C. The yield was 2.5 moles.

2. 2,2,3,3-Tetrakis-(4-hydroxyphenyl)-butane

Hydrogen chloride was passed into a mixture of 21 moles of phenol, 0.7 mole of thioglycolic acid and 1 mole of concentrated hydrochloric acid at 55° C. until the mixture was saturated. Thereafter, 3.5 moles of 2,3-butanediol were added dropwise at 60° C. in the course of 30 minutes with further gassing with HCl, stirring was continued for 5 hours at 65° C. and the excess phenol was distilled off by means of steam distillation.

3. 2,2,4,4-Tetrakis-(4-hydroxyphenyl)-pentane

The procedure described under 2 was followed, except that 42 moles of phenol, 1.4 moles of thioglycolic acid, 2 moles of concentrated hydrochloric acid and 8 moles of 2,4-pentanedione were used.

4. 2,2,5,5-Tetrakis-(4-hydroxyphenyl)-hexane

The procedure described under 2 was followed, except that 21 moles of phenol, 0.7 mole of thioglycolic acid, 1 mole of concentrated hydrochloric acid and 3.5 moles of 2,5-hexanedione were used.

5. Polyphenol of the formula II, where n is 0

16 moles of phenol and 0.5 millimole of tin tetrachloride were heated to 150° C., and 4 moles of α,α'-dimethoxy-p-xylene were added dropwise to the stirred mixture in the course of 3.5 hours. The mixture was allowed to react for a further hour, the methanol formed was distilled off and stirring was continued for a further 90 minutes at 150° C. The product was purified by means of a Sambay distillation under 1 mbar and at a heating jacket temperature of 150° C. The yield was 3.3 moles.

6. Polyphenol of the formula II, where n is 1

The procedure described under 5 was followed, except that 21.5 moles of phenol, 0.6 millimole of SnCl₄ and 10.8 moles of α,α'-dimethoxy-β-xylene were used. The yield was 4.7 moles.

B. Epoxidation 1. 1.5 moles of 1,1,3-tris-(4-hydroxyphenyl)-propane and 27 moles of epichlorohydrin were heated to the reflux temperature, after which 5 moles of 50% NaOH were metered in. Epichlorohydrin and water were removed continuously from the reaction vessel so that the concentration of water was kept at about 1%. The reaction was continued for a further 30 minutes, after which the mixture was cooled to 80° C. and 500 ml of water were added. After phase separation, the organic layer was washed twice with water and then freed from excess epichlorohydrin by means of a Sambay distillation under from 1 to 5 mbar and at a heating jacket temperature of from 140° to 150° C. The yield was 0.9 mole.

2. The procedure described under 1 was followed, except that 1.2 moles of A.2, 27 moles of epichlorohydrin and 5 moles of 50% NaOH were used. The yield was 0.85 mole.

3. The procedure described under 1 was followed, except that 1.7 moles of A.3, 40.5 moles of epichlorohydrin and 7.8 moles of 50% NaOH were used. The yield was 1.1 mole.

4. The procedure described under 1 was followed, except that 1.2 moles of A.4, 27 moles of epichlorohydrin and 5 moles of 50% NaOH were used. The yield was 0.8 mole.

5. The procedure described under 1 was followed, except that 1.5 moles of A.5, 23.7 moles of epichlorohydrin and 2.8 moles of 50% NaOH were used. The yield was 1.3 moles.

6. The procedure described under 1 was followed, except that 1.03 moles of A.6, 27.6 moles of epichlorohydrin and 3.3 moles of 50% NaOH were used. The yield was 0.93 mole.

C. Preparation of the vinyl ester resins

A mixture of 1 mole of methacrylic acid and 0.005 mole of benzyltrimethylammonium chloride was added to one mole of the epoxide compounds B1 to B6, which had been heated to 100° C., and the mixture was stirred for 6–8 hours, the conversion being 90–95%. 0.1% (based on dilute resin) of hydroquinone monomethyl ether was added to the reaction mixture, which was then diluted with 40% of styrene, while cooling.

For comparison, known vinyl ester resins based on bisphenol A (C7) and novolak (C8) as the polyphenol were prepared in the same manner.

D. Preparation of specimens and testing

The resins C1 to C8 were mixed with 2% of tertbutyl perbenzoate, and the mixture was introduced into a mold, either alone or together with glass mats, and was subjected to compression molding at 120°–140° C.

The glass transition temperature of the moldings without mats was determined from the temperature dependence of the shear modulus, and the toughnesses of the reinforced moldings were compared using a falling ball test.

| Result: Vinyl ester resin | Glass transition temperature °C. | Toughness (Ratings 1 to 5) |
|---|---|---|
| C1 | 185 | 3 |
| C2 | 175 | 3–4 |
| C3 | 170 | 3 |
| C4 | 160 | 4 |
| C5 | 150 | 4 |
| C6 | 155 | 4 |
| C7 | 125 | 2 |
| C8 | 155 | 5 |

We claim:

1. A vinylester resin having unsaturated terminal groups produced by a process which comprises: reacting a polyphenol selected from the group consisting of 2,2,3,3,-tetrakis-(4-hydroxyphenyl)-butane, 2,2,4,4,-tetrakis-(4-hydroxyphenyl)-pentane and 2,2,5,5,-tetrakis-(4-hydroxyphenyl)-hexane with epichlorohydrin, and thereafter reacting the formed epoxy product with an unsaturated carboxylic acid.

2. The vinylester resin of claim 1 produced using methacrylic acid as the unsaturated carboxylic acid.

3. The vinylester resin of claim 2 produced using 1,1,3-tris-(4-hydroxyphenyl)-propane as the polyphenol.

4. A vinylester resin having unsaturated terminal groups produced by a process which comprises: reacting 1,1,3-tris-(4-hydroxyphenyl)-propane with epichlorohydrin, and thereafter reacting the formed epoxy product with an unsaturated carboxylic acid.

* * * * *